Dec. 31, 1968         A. L. DEBYE ET AL            3,419,720
         HOLDER FOR RELEASABLY SECURING A SHAPE-RETAINING
              DOSIMETER ELEMENT DURING READOUT
                     Filed Sept. 7, 1965
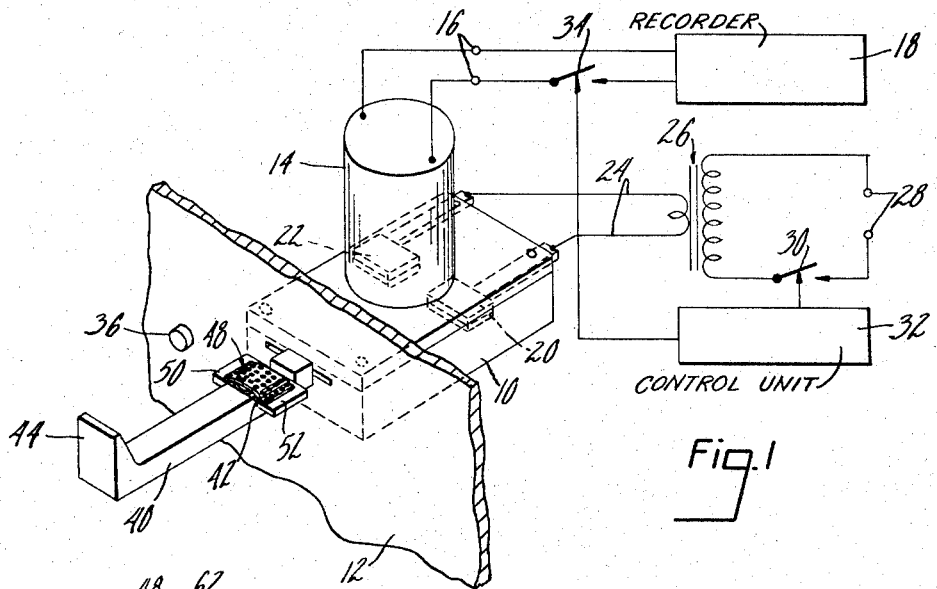
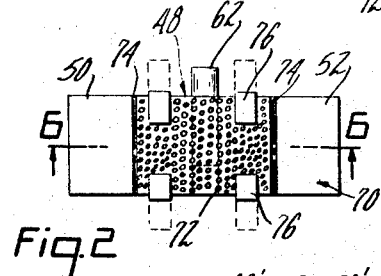
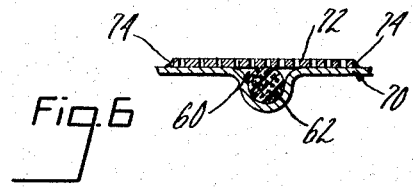
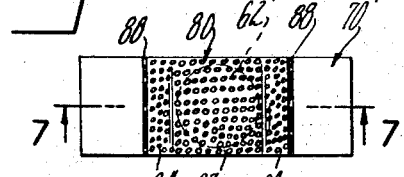
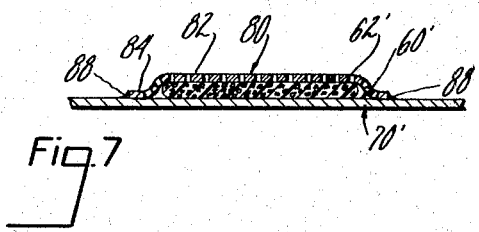
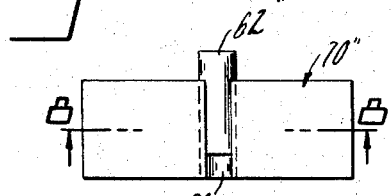
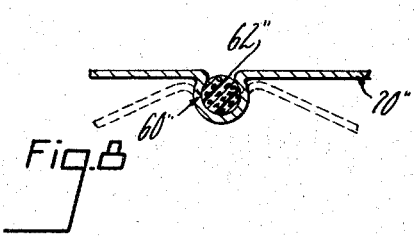
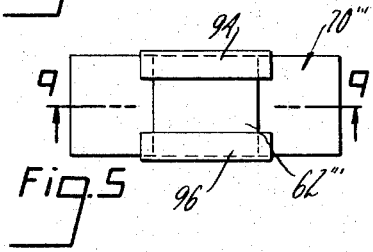
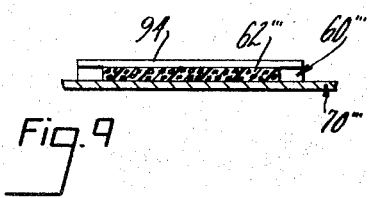

Patented Dec. 31, 1968

3,419,720
HOLDER FOR RELEASABLY SECURING A SHAPE-RETAINING DOSIMETER ELEMENT DURING READOUT
Anne L. Debye, Sudbury, and Bengt Bjarngard, Winchester, Mass., assignors, by mesne assignments, to Isotopes, Inc., Westwood, N.J., a corporation of California
Filed Sept. 7, 1965, Ser. No. 485,294
7 Claims. (Cl. 250—83)

ABSTRACT OF THE DISCLOSURE

A special holder is disclosed for use in securing a shape-retaining dosimeter element during a readout operation, which holder consists of a metallic support with side portions to releasably engage in a physical restraint opposite sides of the shape-retaining dosimeter element during the readout operation. The dosimeter element is inserted into the holder, and the holder is then inserted into a readout instrument. In one form, the holder includes an apertured screen to overlie the dosimeter element. In all cases, at least 50% of the surface of the dosimeter element facing the readout mechanism is exposed.

---

This invention relates to radiation dosimetry and, more particularly, to dosimeters of the thermoluminescent type and to apparatus for reading out such types of dosimeters.

Certain well-known crystalline substances, such as quartz, after exposure to ionizing radiation, give off light when they are heated. This release of light, or luminescence, is caused by the thermo-release of electrons from positions of "metastability" for return to the ground state. A thermoluminescent material of exceptionally good radiation response is lithium fluoride. That material, after exposure to ionizing radiation dosages, in the order of a few milliroentgens (mr.), will release detectible amounts of photon-radiation and is particularly useful in radiation dosimetry. In thermoluminescent dosimetry devices, a precise quantity of thermoluminescent phosphor preferably is disposed in a manner that enables the device to have a uniform response to different types of ionizing radiation, and successive radiation dosage measurements utilizing such devices to have a reproducible uniformity. A dosimeter configuration which is particularly useful for handling purposes and for exposure to ionizing radiation is a structure in which thermoluminescent phosphor material is dispersed uniformly throughout a matrix of solid polymeric material. Such a configuration results in a dosimeter that is convenient to handle and in which the configuration of the thermoluminescent particles is dimensionally stable for exposure to ionizing radiation.

The polymeric material must be chemically inert so that it does not impair the properties of the phosphor by reacting either with the surrounding atmosphere or with the thermoluminescent phosphor itself. The material should not thermoluminesce and should have an atomic composition and density so that the energy independence of the phosphor and its tissue equivalence characteristics are not affected by the presence of the matrix material. In addition, the material must readily transmit the thermoluminescent light from the phosphor while it must be heat resistant so that it will withstand the readout temperatures without changing its mechanical and optical properties. Suitable chemically inert light-transmitting materials typically are extremely poor heat conductors and also tend to deform when subjected to temperatures involved in the thermoluminescent readout operation.

It is a primary object of this invention to provide novel and improved apparatus for facilitating the readout of radiation dosimeters of the thermoluminescent type.

Another object of the invention is to provide a novel and improved holder for thermoluminescent dosimeter material which facilitates its readout under reproducible conditions and which provides a reproducible heating cycle.

In accordance with the invention, there is provided apparatus for use with dosimeter readout apparatus that includes a light sensor and a housing in which the dosimeter is disposed for energization in a dose readout operation while exposed to the light sensor. For this purpose, there is provided a holder for releasably securing the solid dosimeter element of thermoluminescent phosphor material dispersed uniformly throughout a matrix of polymeric material. This holder includes a metallic support element which defines a chamber that imposes a physical constraint on the dosimeter element when it is disposed in the chamber so that the dosimeter element retains the same physical configuration during the readout operation. One wall of the chamber of the support element has a light-reflecting surface and the wall opposite that one wall is apertured so that at least 50% of the projected surface of the dosimeter element secured in the holder is directly exposed to the light sensor when the holder is disposed in the housing of the readout apparatus.

In a preferred embodiment of the invention, this support element is manufactured of a metal of high electrical resistivity such as metals sold under the trademark "Nichrome" and the trademark "Ohmaloy." The support element further includes, on opposite sides of the chamber, terminal portions which are arranged to be connected in electrical circuit within the housing so that electric current may be passed through the support element while that element is in the housing and, due to its high resistance, that electric current is converted to thermal energy sufficient to heat the phosphor material in the polymeric matrix to the readout temperature. During this thermal readout, the chamber constrains the dosimeter element so that its physical dimensions do not change and thus significantly increases the reproducibility of the readout of such dosimeter elements.

Other objects, features and advantages of the invention will be seen as the following description of preferred embodiments thereof progresses, in conjunction with the drawings, in which:

FIGURE 1 is a schematic diagram of thermoluminescent dosimeter readout apparatus useful in the practice of the invention;

FIGURES 2–5 are top plan views of dosimeter support-heater elements constructed in accordance with the invention; and FIGURES 6–9 are sectional views taken along the lines 6—6, 7—7, 8—8, and 9—9 of FIGURES 2, 3, 4 and 5, respectively.

The dosimeter readout apparatus shown in FIGURE 1 includes a light-tight, dosimeter heating housing 10 which is mounted within a casing 12 (only a portion of the front wall thereof being shown). Mounted on top of the heater housing 10 is a light sensor housing 14 in which is disposed a photomultiplier tube or other suitable type of light sensor positioned for viewing the interior of housing 10. Terminals 16 connect the light sensor to recording equipment 18 for recording the radiation detected by the sensor.

Mounted within housing 10 are two sets of electrical contacts 20, 22, that are spaced apart so that they are positioned on opposite sides of the area of surveillance of the light sensor. These sets of contacts are connected by means of conductors 24 to a step down transformer 26 which is connected to an energizing source at terminals 28. Application of power to transformer 26 is controlled by switch 30. Control unit 32 includes a timing unit which actuates heater energization switch 30 and readout circuitry switch 34 in a timing cycle that is initiated by pushbutton 36 on the face of casing 12.

A movable slide 40 is arranged for longitudinal movement relative to the heating housing 10 through the front wall of the casing 12. This slide includes a planchet locating portion in the form of a rectangular recess 42 which recess is movable between a position outside the casing when the slide is fully withdrawn and a position directly beneath the light sensor and between the contacts 20 and 22 when the slide is fully inserted. A suitable handle 44 is provided for facilitating the manipulation of the slide.

A planchet of configuration such as shown in FIGURES 2–5 and corresponding FIGURES 6–9 is disposed in recess 42. This planchet has a central portion 48 in which the dosimeter is secured and on opposite sides of that central portion are terminals 50 and 52 which are engaged by and complete electrical circuits with contacts 20 and 22 within the housing 10 when the slide is inserted into that housing.

The planchet may take a variety of configurations of which the planchets shown in FIGURES 2–5 are illustrative. In each planchet, there is provided a chamber 60 which receives a dosimeter element 62. This dosimeter element includes a thermoluminescent phosphor material, such as lithium fluoride, which is uniformly dispersed throughout a matrix of a solid polymeric material such as polytetrafluoroethylene. Other suitable phosphor materials and matrix materials will be obvious to those skilled in the art. The chamber 60 is dimensioned so that when the dosimeter element 62, which may be in the form of a rod one millimeter in diameter and six millimeters long, for example, as indicated in FIGURE 2, or the form of a disc 0.01 inch in thickness and ½ inch in diameter as indicated in FIGURE 3, or the form of a 1 inch length of tape 0.015 inch in thickness as indicated in FIGURE 5, is positioned in the chamber, that chamber imposes firm physical constraint on the dosimeter element so that the dosimeter element retains its same physical configuration during the heating operation.

Each illustrated planchet element includes an imperforate support member 70 on the order of 1.125 inches in width and the order of 0.01 inch in thickness. This support member forms one wall of the chamber 60 and its surface forming the wall of that chamber may be polished so that it will be a light reflector. The other wall of the chamber is apertured in a manner to provide at least 50% open area while imposing the required physical constraint on the dosimeter element. For example, in the dosimeter shown in FIGURES 2 and 6, this second wall of the chamber is formed from a nickel mesh structure 72 that has holes formed in it. This mesh 72 may be secured to the support element 70 by means of a weld 74, or alternatively by means of mechanical tabs 76, which are formed from the material of the support element 70 itself and bent over as indicated in FIGURE 2 from the dotted line position to the full line position to secure the screen 72 firmly in place.

A second configuration is shown in FIGURES 3 and 7 suitable for receiving a disc type of dosimeter. In this configuration, the support element 70' is a planar element and a screen element 80 has a raised central portion 82 and depressed edge portions 84, 86, which are secured to the support element 70' on either side of the chamber area by weld beads 88 to secure the screen 82 in firm parallel relation to the support element 70' and thus define a chamber 60' between the parallel walls.

Still another configuration of dosimeter holder is shown in FIGURES 4 and 8 in which the chamber is formed for receiving a rod type of dosimeter 62'' by configuring the metal support element 70'' to provide a cylindrical chamber portion 60'' which extends around a circumference in the order of 200°. This chamber has an aperture 90 which extends across the entire width of the holder and has an area substantially greater than half the projected area of the dosimeter 62''. Again, the surface of the dosimeter in the vicinity of the cylindrical channel may be polished so that its surface is reflective. In loading this dosimeter planchet, the dosimeter 62'' may be snapped into place or slid in axially. (The dosimeter 62'' is shown only partially inserted in the chamber 60'' in FIGURE 4 (and in FIGURE 2).) To remove the dosimeter from the planchet, all that need be done is to bend the holder to the position indicated by dotted lines in FIGURE 8 and release the dosimeter 62'' from the chamber.

A further form of holder is indicated in FIGURES 5 and 9. In this arrangement, the support element 70''' has tab portion 94, 96 bent upward from its side walls to overlie a portion of the support surface and form a chamber therebetween. These tab portions 94, 96 may directly form the chamber or where further constraint on the dosimeter element 62''' is desired, a section of mesh such as employed in the embodiment shown in FIGURE 2 may be also disposed over or secured under the tabs to provide a chamber 60''' between the mesh and the support surface for the dosimeter element 62'''.

In operation, the solid dosimeter 62 is exposed to ionizing radiation and then that dosimeter is inserted into the chamber of the planchet and the planchet placed on the recess 42 of the slide 40. The slide is then inserted into the readout housing so that terminals 50, 52, are connected to contacts 20, 22. The control unit is actuated by depressing button 36 to close the switch 30 and energize transformer 26 to pass electric current through the support 70 to heat the dosimeter element 62. At an appropriate time in the sequence, switch 34 is closed and the light sensor 14 connected to the recording equipment 18 to record the light output produced by the heating of the dosimeter. This light output provides an accurate indication of the ionizing radiation to which the dosimeter 62 has been exposed. It will be noted that the dosimeter is constrained throughout the reading operation so that its physical configuration does not change and distort the readout. Also, the chamber retains the dosimeter in intimate thermal contact with the heating element to maximize the thermal efficiency of the heating operation and avoid the possibility of excessive heating of some portions of the dosimeter while inadequately heating other portions of the dosimeter.

While preferred embodiments of the invention have been disclosed and described, various modifications thereof will occur to those skilled in the art. For example, it is obvious that the invention may be practiced with a dosimeter holder permanently connected in electric circuit. Therefore, it is not intended that the invention be limited to the disclosed embodiment or to details thereof and departures may be made therefrom within the spirit and scope of the invention as defined in the claims.

What is claimed is:

1. A holder for use with dosimeter readout apparatus which holder includes a light sensor and a housing in which to dispose a dosimeter for energization in a dose readout operation while exposed to said light sensor, with said holder including a metallic support portion for supporting a shape-retaining dosimeter element with a portion of the dosimeter element surface facing the light sensor, and opposed portions for releasably engaging and holding the shape-retaining dosimeter element on said metallic support portion by imposing physical restraint on opposite side portions of the shape-retaining dosimeter element in a manner that at least 50% of the surface facing said light sensor is directly exposed thereto.

2. The holder of claim 1 in which the metallic support portion is a material of high electrical resistivity and includes terminal portions disposed on opposite sides thereof, which terminal portions are arranged to be connected electrically within the housing.

3. The holder of claim 1, further including an apertured screen element to overlie the surface of the shape-retaining dosimeter element, with the apertures exposing at least 50% of said surface.

4. The holder of claim 3 wherein said screen element is attached to said opposed portions.

5. The holder of claim 1 wherein said opposed portions are constituted from tabs attached to said support portion and which are bent over to engage the dosimeter element.

6. The holder of claim 5, further including a screen element to overlie the dosimeter element, which screen element is positively engaged by said opposed portions which are in the form of tabs.

7. The holder of claim 1, further characterized by being formed of resilient material, and including terminal portions disposed on opposite sides thereof adapted to be flexed relative to one another for changing the physical configuration of the metallic support portion and opposed portions to enable the dosimeter element to be engaged and disengaged.

References Cited

UNITED STATES PATENTS

| | | | |
|---|---|---|---|
| 3,115,578 | 12/1963 | Schulman | 250—71 |
| 3,141,973 | 7/1964 | Heins et al. | 250—71 |
| 3,176,133 | 3/1965 | McCall et al. | 250—71.5 |
| 3,229,097 | 1/1966 | Durkee et al. | 250—71 X |

ARCHIE R. BORCHELT, *Primary Examiner.*

U.S. Cl. X.R.

250—71, 71.5